US010558175B2

(12) United States Patent
Tsubata et al.

(10) Patent No.: US 10,558,175 B2
(45) Date of Patent: Feb. 11, 2020

(54) PID CONTROL DEVICE, PID CONTROL METHOD, AND PID CONTROL PROGRAM

(71) Applicant: OMRON Corporation, Kyoto (JP)

(72) Inventors: Hajime Tsubata, Kusatsu (JP); Ryosuke Hasui, Kyoto (JP); Takaaki Yamada, Kusatsu (JP); Hitoshi Tanaka, Otsu (JP)

(73) Assignee: OMRON Corporation, Kyoto (JP)

( * ) Notice: Subject to any disclaimer, the term of this patent is extended or adjusted under 35 U.S.C. 154(b) by 208 days.

(21) Appl. No.: 15/784,210

(22) Filed: Oct. 16, 2017

(65) Prior Publication Data

US 2018/0217565 A1  Aug. 2, 2018

(30) Foreign Application Priority Data

Jan. 31, 2017  (JP) .................................. 2017-015056

(51) Int. Cl.
*G05B 11/42* (2006.01)
*G05B 13/02* (2006.01)
(Continued)

(52) U.S. Cl.
CPC ................ *G05B 11/42* (2013.01); *G05B 5/01* (2013.01); *G05B 13/024* (2013.01); *G05B 13/0245* (2013.01); *G05B 21/02* (2013.01)

(58) Field of Classification Search
CPC ...... G05B 11/42; G05B 13/024; G05B 21/02; G05B 5/01; G05B 13/0245
See application file for complete search history.

(56) References Cited

U.S. PATENT DOCUMENTS

| 5,359,836 | A | * | 11/1994 | Zeuner | ................. | A01D 41/141 |
| | | | | | | 56/10.2 E |
| 5,981,118 | A | * | 11/1999 | Yasutake | ................ | B82Y 10/00 |
| | | | | | | 430/30 |
| 2014/0337256 | A1 | * | 11/2014 | Varadi | .................... | G05B 13/04 |
| | | | | | | 706/12 |

FOREIGN PATENT DOCUMENTS

| EP | 2105810 | 9/2009 |
| EP | 2365627 | 9/2011 |

(Continued)

OTHER PUBLICATIONS

"Search Report of Europe Counterpart Application", dated Apr. 26, 2018, p. 1-p. 5.

(Continued)

*Primary Examiner* — Ziaul Karim
(74) *Attorney, Agent, or Firm* — JCIPRNET (57) ABSTRACT

A technique capable of shortening a period in which value of a PID parameter is outside of an appropriate range is provided. A measured value acquisition functional unit processes a sensing signal of a sensor that measures a barrel and acquires a measured value of the barrel. A storage unit stores a target value of the barrel and a PID parameter. An operation amount calculation functional unit calculates an amount of operation using the PID parameter and a difference between the measured value and the target value. A first output unit and a second output unit output the amount of operation. A first updating functional unit updates the PID parameter through a first update process when the variation range is greater than a first range, and a second updating functional unit updates the PID parameter through a second update process when the variation range is less than a second range.

16 Claims, 4 Drawing Sheets

(51) Int. Cl.
*G05B 5/01* (2006.01)
*G05B 21/02* (2006.01)

(56) References Cited

FOREIGN PATENT DOCUMENTS

| | | |
|---|---|---|
| JP | H05108107 | 4/1993 |
| JP | H05289704 | 11/1993 |
| JP | 2016004377 | 1/2016 |
| KR | 20150072036 | 6/2015 |

OTHER PUBLICATIONS

Office Action of Korean Counterpart Application, with English translation thereof, dated Jan. 21, 2019, pp. 1-14.

* cited by examiner

PID CONTROL DEVICE, PID CONTROL METHOD, AND PID CONTROL PROGRAM

CROSS-REFERENCE TO RELATED APPLICATION

This application claims the priority benefit of Japan application no. 2017-015056, filed on Jan. 31, 2017. The entirety of the above-mentioned patent applications is hereby incorporated by reference herein and made a part of this specification.

BACKGROUND OF THE INVENTION

Field of the Invention

The present invention relates to a technique of performing PID control on a control target such as a temperature, a pressure, or a speed using a PID parameter.

Description of Related Art

In the related art, a device that performs PID control on a control target such as a temperature, a pressure, or a speed using a PID parameter is known. Such a device has an automatic tuning function of automatically setting a PID parameter which is used for PID control. A device having an automatic tuning function performs a process of automatically setting a PID parameter when a user performs a specific operation such as pressing an automatic tuning key. The function of automatically setting a PID parameter using the automatic tuning function includes a process of changing an amount of operation in a predetermined pattern and detecting a change pattern of a control target, and a process of calculating and setting (updating) a PID parameter on the basis of the detected change pattern of the control target.

A device described in Patent Document 1 has a configuration in which a PID parameter is updated using at least one feature of a vibration period and an attenuation rate of a response waveform when disturbance in the response waveform of a control target is detected. That is, the device described in Patent Document 1 has a configuration in which a PID parameter is automatically updated when the value of the PID parameter is outside of an appropriate range due to a change in a surrounding environment of an instrument for a control target, a change in settings of the instrument, or the like.

PRIOR ART DOCUMENT

[Patent Document]
[Patent Document 1] Japanese Unexamined Patent Application Publication No. H5-108107

SUMMARY OF THE INVENTION

However, in Patent Document 1, the PID parameter is updated on the condition that disturbance in a response waveform of a control target is detected. In other words, Patent Document 1 discloses a configuration in which the PID parameter is not updated when disturbance in a response waveform of a control target is not detected. That is, in Patent Document 1, updating of the PID parameter is started with departure of the value of the PID parameter from an appropriate range as a trigger. Accordingly, in Patent Document 1, a period in which the value of the PID parameter is outside of an appropriate range (a period until updating of the PID parameter is completed after disturbance in a response waveform of a control target is detected) is long.

When a temperature, a pressure, a speed, or the like of a production machine is a control target, non-defective products cannot be produced in a period in which the value of the PID parameter is outside of an appropriate range. Accordingly, a yield rate is decreased with elongation of the period in which the value of the PID parameter is outside of an appropriate range. Running costs are increased due to power which is consumed in the period in which the value of the PID parameter is outside of the appropriate range, or the like.

An object of the invention is to provide a technique capable of shortening a period in which a value of a PID parameter is outside of an appropriate range.

A PID control device according to the invention is configured as follows to achieve the above-mentioned object.

A target value of a control target and a PID parameter are stored in a storage unit. A measured value acquiring unit processes a sensing signal of a sensor that measures the control target and acquires a measured value of the control target. For example, when the control target is a temperature, the sensor is a temperature sensor such as a thermocouple or a resistance thermometer and an output of the temperature sensor is the sensing signal. The operation amount calculating unit calculates an amount of operation using the PID parameter and a difference between the measured value of the control target and a target value of the control target. An output unit outputs the amount of operation calculated by the operation amount calculating unit.

A variation range detecting unit detects a variation range of the measured value of the control target. An update unit updates the PID parameter on the basis of the variation range of the measured value of the control target which is detected by the variation range detecting unit.

According to this configuration, the PID parameter is updated to a more appropriate value at that time regardless of whether the value thereof is outside of an appropriate range. Accordingly, it is possible to prevent the value of the PID parameter from departing from an appropriate range and to immediately update the value of the PID parameter to a value in an appropriate range even when the value of the PID parameter is outside of the appropriate range. That is, it is possible to shorten a period in which the value of the PID parameter is outside of an appropriate range.

The update unit updates the PID parameter when the variation range of the measured value of the control target which is detected by the variation range detecting unit is greater than a first range or less than a second range.

When the variation range of the measured value of the control target is greater than the first range, a proportional gain (a P gain) of the PID parameter has a relatively large value. On the other hand, when the variation range of the measured value of the control target is less than the second range, the proportional gain of the PID parameter has a relatively small value.

Accordingly, when the variation range of the measured value of the control target is greater than the first range, the proportional gain of the PID parameter can be updated to a value which is smaller than the value at that time. When the variation range of the measured value of the control target is less than the second range, the proportional gain of the PID parameter can be updated to a value which is greater than the value at that time. Accordingly, it is possible to update the proportional gain of the PID parameter to a more appropriate value.

In this case, when the variation range of the measured value of the control target is between the first range and the second range, the PID parameter may not be updated. The first range and the second range may be set to be same.

When the PID control device is a device that performs heating and cooling control by the PID control, the operation amount calculating unit can be configured to calculate an amount of operation for a heater and an amount of operation for a cooler.

In this case, the storage unit may be configured to store a heater PID parameter which is used to calculate the amount of operation for the heater and a cooler PID parameter which is used to calculate the amount of operation for the cooler, and the update unit may be configured to update the cooler PID parameter but not to update the heater PID parameter. According to this configuration, it is possible to suppress a processing load of the PID control device itself.

When the amount of operation for the cooler which is output from the output unit is 0, it is estimated that the PID control for the heater is not proper and thus it is preferable that the cooler PID parameter not be updated (that only the heater PID parameter be updated). When the amount of operation for the heater which is output from the output unit is 0, it is estimated that the PID control for the cooler is not proper and thus it is preferable that the heater PID parameter not be updated (that only the cooler PID parameter be updated).

According to the invention, it is possible to shorten a period in which a value of a PID parameter is outside of an appropriate range.

DESCRIPTION OF THE EMBODIMENTS

Hereinafter, a PID control device according to an embodiment of the invention will be described.

Figure 1:
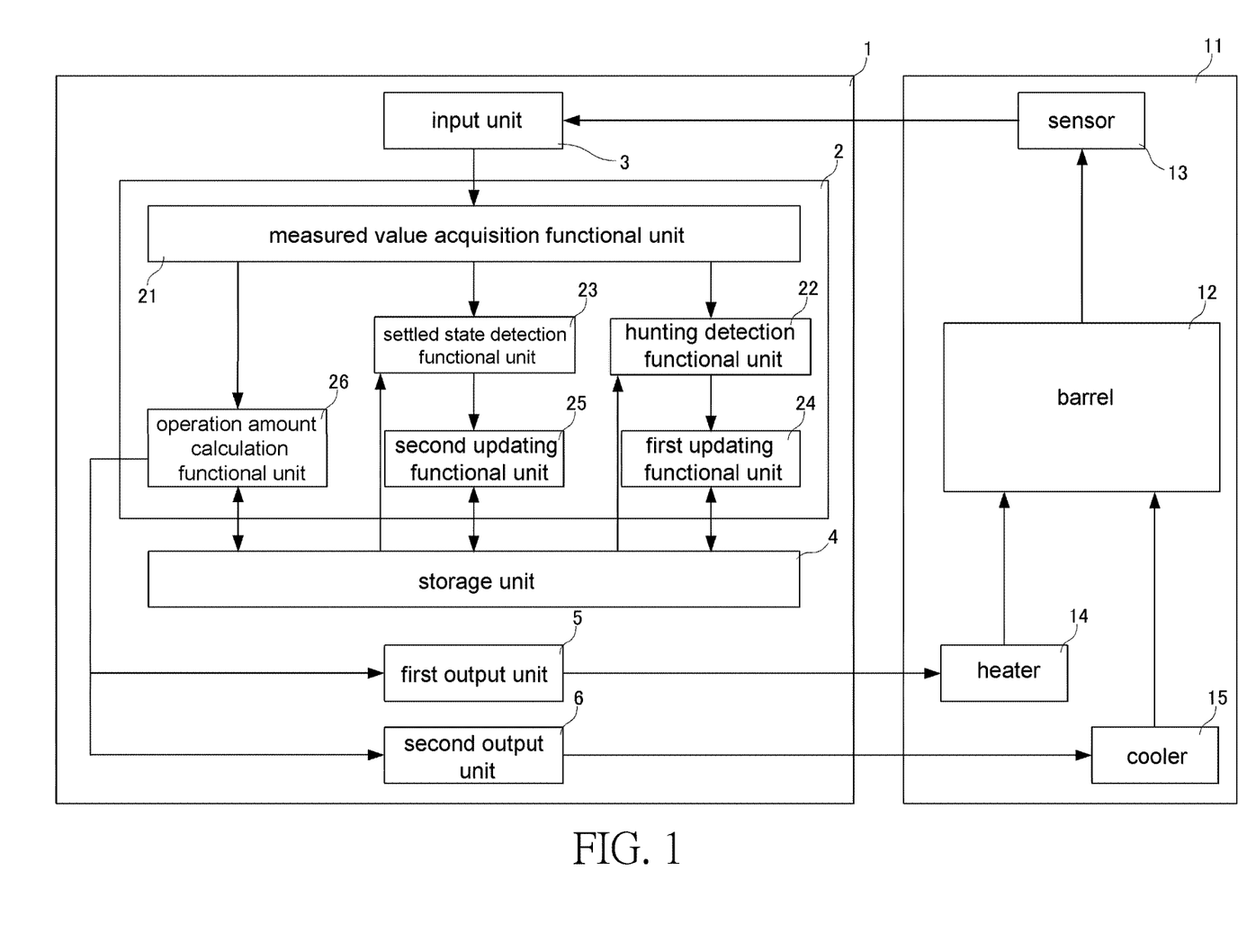
FIG. 1 is a block diagram illustrating a configuration of principal parts of a PID control device according to an embodiment.

FIG. 1 is a block diagram illustrating a configuration of principal parts of the PID control device according to this embodiment. The PID control device 1 according to this embodiment controls a temperature of a barrel 12 of an extrusion molding machine 11 by PID control. That is, a control target of the PID control device 1 according to this embodiment is a temperature of the barrel 12 of the extrusion molding machine 11. A sensor 13 senses the temperature of the barrel 12. A sensing signal of the sensor 13 (a sensing signal obtained by sensing the temperature of the barrel 12) is input to the PID control device 1. A heater 14 heats the barrel 12 and a cooler 15 cools the barrel 12. The PID control device 1 inputs an amount of operation to the heater 14 and inputs an amount of operation to the cooler 15. The heater 14 heats the barrel 12 on the basis of the amount of operation input from the PID control device 1. The cooler 15 cools the barrel 12 on the basis of the amount of operation input from the PID control device 1.

The PID control device 1 separately calculates an amount of operation for the heater 14 and an amount of operation for the cooler 15.

As illustrated in FIG. 1, the PID control device 1 includes a control unit 2, an input unit 3, a storage unit 4, a first output unit 5, and a second output unit 6.

The control unit 2 controls operations of the units of the PID control device 1. The control unit 2 includes a hardware CPU, a memory, and other electronic circuits. The hardware CPU functions as functional units which will be described later. Details of the functional units of the control unit 2 will be described later. The control unit 2 corresponds to a computer that performs a PID control method according to the invention. The control unit 2 corresponds to a computer that executes a PID control program according to the invention. The control unit 2 may be an LSI (Large Scale Integration) into which the hardware CPU, a memory, and other electronic circuits are incorporated.

The sensor 13 is connected to the input unit 3, and the sensing signal of the sensor 13 obtained by sensing the temperature of the barrel 12 is input thereto.

The storage unit 4 stores a target value, a heater PID parameter, a cooler PID parameter, a first variation range, and a second variation range. The target value is a target temperature of the barrel 12 which is a control target. A user can perform an input operation of setting a target value on the storage unit 4 using an operation unit or the like which is not illustrated.

The PID parameter includes a proportional gain (a P gain), an integral gain (an I gain), and a differential gain (a D gain) as is well known. The PID control device 1 according to this embodiment may have a configuration in which the I gain and the D gain are common to the heater PID parameter and the cooler PID parameter or may have a configuration in which the I gain and the D gain are not common. The P gain is not common to the heater PID parameter and the cooler PID parameter.

The first variation range is a parameter which is used to detect whether a fluctuation of the temperature of the barrel 12 is relatively great. The second variation range is a parameter which is used to detect whether a fluctuation of the temperature of the barrel 12 is relative small. The first variation range is greater than the second variation range. The first variation range corresponds to the first range in the present invention and the second variation range corresponds to the second range in the present invention.

The first output unit 5 outputs an amount of operation to the heater 14 connected thereto. The second output unit 6 outputs an amount of operation to the cooler 15 connected thereto. The first output unit 5 and the second output unit 6 correspond to the output unit in the present invention.

The functional configuration of the control unit 2 will be described below. The control unit 2 includes a measured value acquisition functional unit 21, a hunting detection functional unit 22, a settled state detection functional unit 23, a first updating functional unit 24, a second updating functional unit 25, and an operation amount calculation functional unit 26.

The measured value acquisition functional unit 21 processes a sensing signal of the sensor 13 input to the input unit 3, and acquires the temperature of the barrel 12 which is a control target. The measured value acquisition functional unit 21 corresponds to the measured value acquiring unit in the present invention.

The hunting detection functional unit 22 detects whether the temperature of the barrel 12 is in a hunting state in which the temperature fluctuates relatively greatly. The hunting detection functional unit 22 repeatedly detects whether the temperature is in the hunting state in a predetermined state detection period (one period is ft). When a temperature difference between a maximum value of the temperature of the barrel 12 acquired by the measured value acquisition functional unit 21 and a minimum value of the temperature of the barrel 12 acquired by the measured value acquisition functional unit 21 is greater than the first variation range stored in the storage unit 4 in the state detection period, the hunting detection functional unit 22 detects that the temperature is in the hunting state. When the temperature difference between the maximum value of the temperature of the barrel 12 acquired by the measured value acquisition functional unit 21 and the minimum value of the temperature of the barrel 12 acquired by the measured value acquisition functional unit 21 is less than the first variation range stored in the storage unit 4 in the state detection period, the hunting detection functional unit 22 detects that the temperature is not in the hunting state.

When the temperature difference between the maximum value of the temperature of the barrel 12 acquired by the measured value acquisition functional unit 21 and the minimum value of the temperature of the barrel 12 acquired by the measured value acquisition functional unit 21 is equal to the first variation range stored in the storage unit 4 in the state detection period, the hunting detection functional unit 22 may detect that the temperature is in the hunting state or may detect that the temperature is not in the hunting state.

The settled state detection functional unit 23 detects whether the temperature of the barrel 12 is in a settled state in which the temperature hardly fluctuates. The settled state detection functional unit 23 repeatedly detects whether the temperature is in the settled state in a predetermined state detection period. When the temperature difference between the maximum value of the temperature of the barrel 12 acquired by the measured value acquisition functional unit 21 and the minimum value of the temperature of the barrel 12 acquired by the measured value acquisition functional unit 21 is less than the second variation range stored in the storage unit 4 in the state detection period, the settled state detection functional unit 23 detects that the temperature is in the settled state. When the temperature difference between the maximum value of the temperature of the barrel 12 acquired by the measured value acquisition functional unit 21 and the minimum value of the temperature of the barrel 12 acquired by the measured value acquisition functional unit 21 is greater than the second variation range stored in the storage unit 4 in the state detection period, the settled state detection functional unit 23 detects that the temperature is not in the settled state.

When the temperature difference between the maximum value of the temperature of the barrel 12 acquired by the measured value acquisition functional unit 21 and the minimum value of the temperature of the barrel 12 acquired by the measured value acquisition functional unit 21 is equal to the second variation range stored in the storage unit 4 in the state detection period, the settled state detection functional unit 23 may detect that the temperature is in the settled state or may detect that the temperature is not in the settled state.

In this embodiment, since the first variation range is greater than the second variation range as described above, the settled state detection functional unit 23 does not detect that the temperature is in the settled state when the hunting detection functional unit 22 detects that the temperature is in the hunting state. The hunting detection functional unit 22 does not detect that the temperature is in the hunting state when the settled state detection functional unit 23 detects that the temperature is in the settled state. Each of the hunting detection functional unit 22 and the settled state detection functional unit 23 has a configuration corresponding to the variation range detecting unit in the present invention.

When the hunting detection functional unit 22 detects the temperature is in the hunting state, the first updating functional unit 24 updates the cooler PID parameter stored in the storage unit 4. In other words, when the hunting detection functional unit 22 does not detect that the temperature is in the hunting state, the first updating functional unit 24 does not update the cooler PID parameter stored in the storage unit 4.

In this embodiment, the first updating functional unit 24 is configured not to update the heater PID parameter stored in the storage unit 4, but may be configured to update the heater PID parameter.

When the settled state detection functional unit 23 detects that the temperature is in the settled state, the second updating functional unit 25 updates the cooler PID parameter stored in the storage unit 4. In other words, when the settled state detection functional unit 23 does not detect that the temperature is in the settled state, the second updating functional unit 25 does not update the cooler PID parameter stored in the storage unit 4.

In this embodiment, the second updating functional unit 25 is configured not to update the heater PID parameter stored in the storage unit 4, but may be configured to update the heater PID parameter.

The first updating functional unit 24 and the second updating functional unit 25 correspond to the update unit in the present invention. The first updating functional unit 24 performs the first updating process in the present invention, and the second updating functional unit 25 performs the second updating process in the present invention.

The operation amount calculation functional unit 26 calculates an amount of operation for the heater 14 and an amount of operation for the cooler 15 on the basis of the difference between the temperature of the barrel 12 acquired by the measured value acquisition functional unit 21 and the target value stored in the storage unit 4. The operation amount calculation functional unit 26 calculates the amount of operation for the heater 14 using the heater PID parameter stored in the storage unit 4 at that time. The operation amount calculation functional unit 26 calculates the amount of operation for the cooler 15 using the cooler PID parameter stored in the storage unit 4 at that time. The operation amount calculation functional unit 26 corresponds to the operation amount calculating unit in the present invention.

The first output unit 5 outputs the amount of operation for the heater 14 calculated by the operation amount calculation functional unit 26 to the heater 14 connected thereto. The second output unit 6 outputs the amount of operation for the cooler 15 calculated by the operation amount calculation functional unit 26 to the cooler 15 connected thereto.

The operation of the PID control device 1 according to this embodiment will be described below. The PID control device 1 according to this embodiment performs a PID control process of controlling the temperature of the barrel 12 which is a control target to a target value and a PID parameter updating process of updating the cooler PID parameter stored in the storage unit 4 in parallel.

Figure 2:
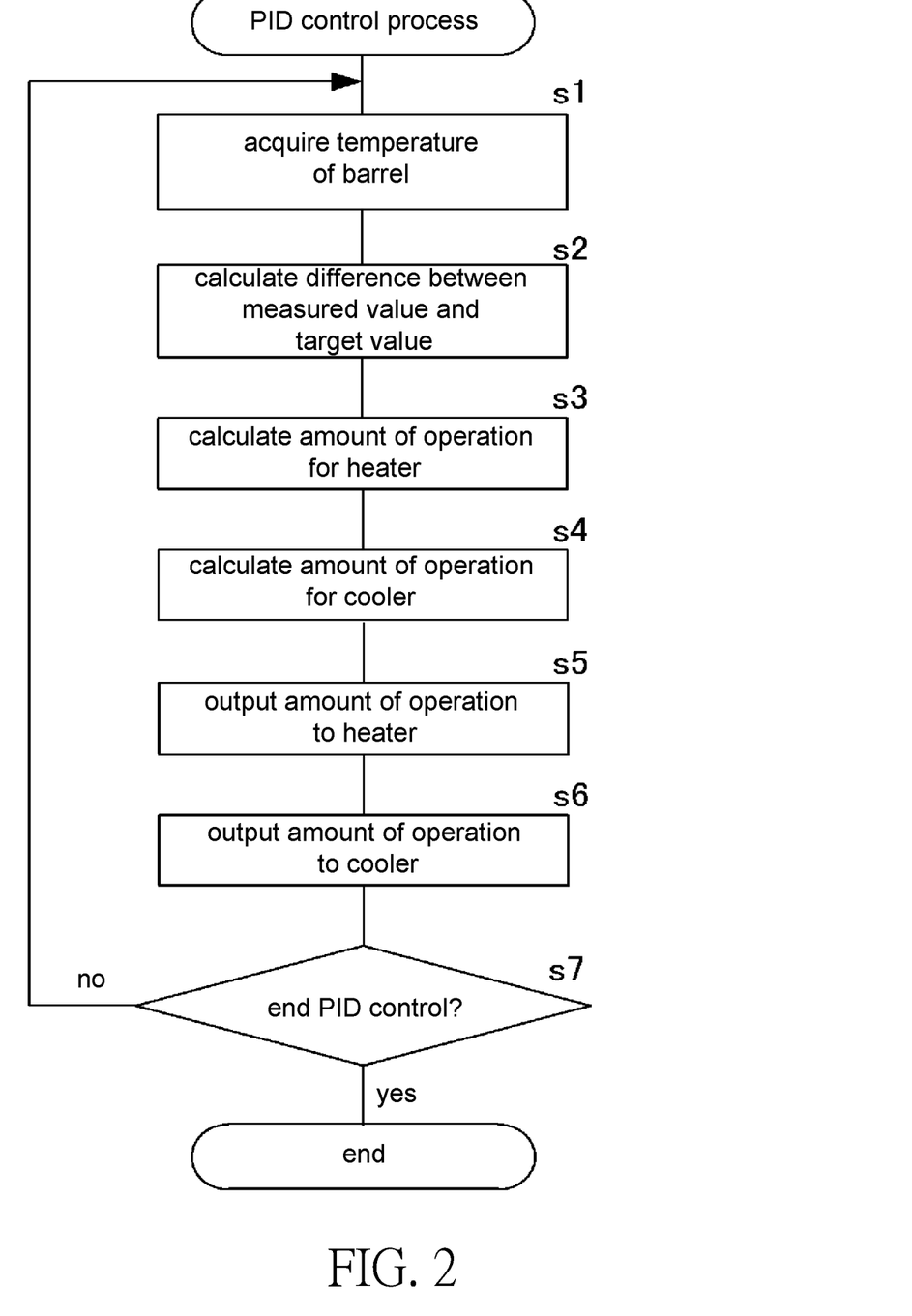
FIG. 2 is a flowchart illustrating a PID control process of the PID control device according to the embodiment.

FIG. 2 is a flowchart illustrating the PID control process of the PID control device according to this embodiment. The PID control device 1 acquires the temperature of the barrel 12 (s1). In s1, the measured value acquisition functional unit 21 acquires the temperature of the barrel 12 by processing a sensing signal of the sensor 13 input to the input unit 3.

The operation amount calculation functional unit 26 calculates a difference between the temperature (the measured value) of the barrel 12 acquired in s1 and the target value of the temperature of the barrel 12 stored in the storage unit 4 (s2). The operation amount calculation functional unit 26 calculates an amount of operation for the heater 14 using the difference calculated in s2 and the heater PID parameter stored in the storage unit 4 at that time (s3). The operation amount calculation functional unit 26 calculates an amount of operation for the cooler 15 using the difference calculated in s2 and the cooler PID parameter stored in the storage unit 4 at that time (s4). The process of s3 and the process of s4 may be performed in any order or may be performed in parallel.

The PID control device 1 outputs the amount of operation for the heater 14 calculated in s3 to the heater 14 from the first output unit 5 and outputs the amount of operation for the cooler 15 calculated in s4 to the cooler 15 from the second output unit 6 (s5 and s6). The heater 14 performs heating control to heat the barrel 12 based on the amount of operation input from the PID control device 1. The cooler 15 performs flow control of a coolant to cool the barrel 12 based on the amount of operation input from the PID control device 1. The process of s5 and the process of s6 may be performed in any order or may be performed in parallel.

For example, when the temperature of the barrel 12 acquired in s1 is higher a predetermined temperature than the target temperature, the PID control device 1 sets the amount of operation for the heater 14 to zero (the amount of heat emitted from the heater 14 is set to zero). When the temperature of the barrel 12 acquired in s1 is lower a predetermined temperature than the target temperature, the PID control device 1 sets the amount of operation for the cooler 15 to zero (the flow rate of the coolant is set to zero). When the difference between the temperature of the barrel 12 acquired in s1 and the target temperature is less than a predetermined temperature, the PID control device 1 may be configured to set the amounts of operation for the heater 14 and the cooler 15 to zero (to perform so-called heating and cooling control with a dead band set) or may be configured not to set both the amounts of operation for the heater 14 and the cooler 15 to zero (to perform so-called heating and cooling control with an overlap set).

The PID control device 1 repeatedly performs the processes of s1 to s6 until a PID control end time comes in (s7). The PID control end time can be set to, for example, a time at which stoppage of the extrusion molding machine 11 is detected. The PID control device 1 can be configured to start the PID control process illustrated in FIG. 2, for example, by interlocking with starting of the extrusion molding machine 11.

Figure 3:
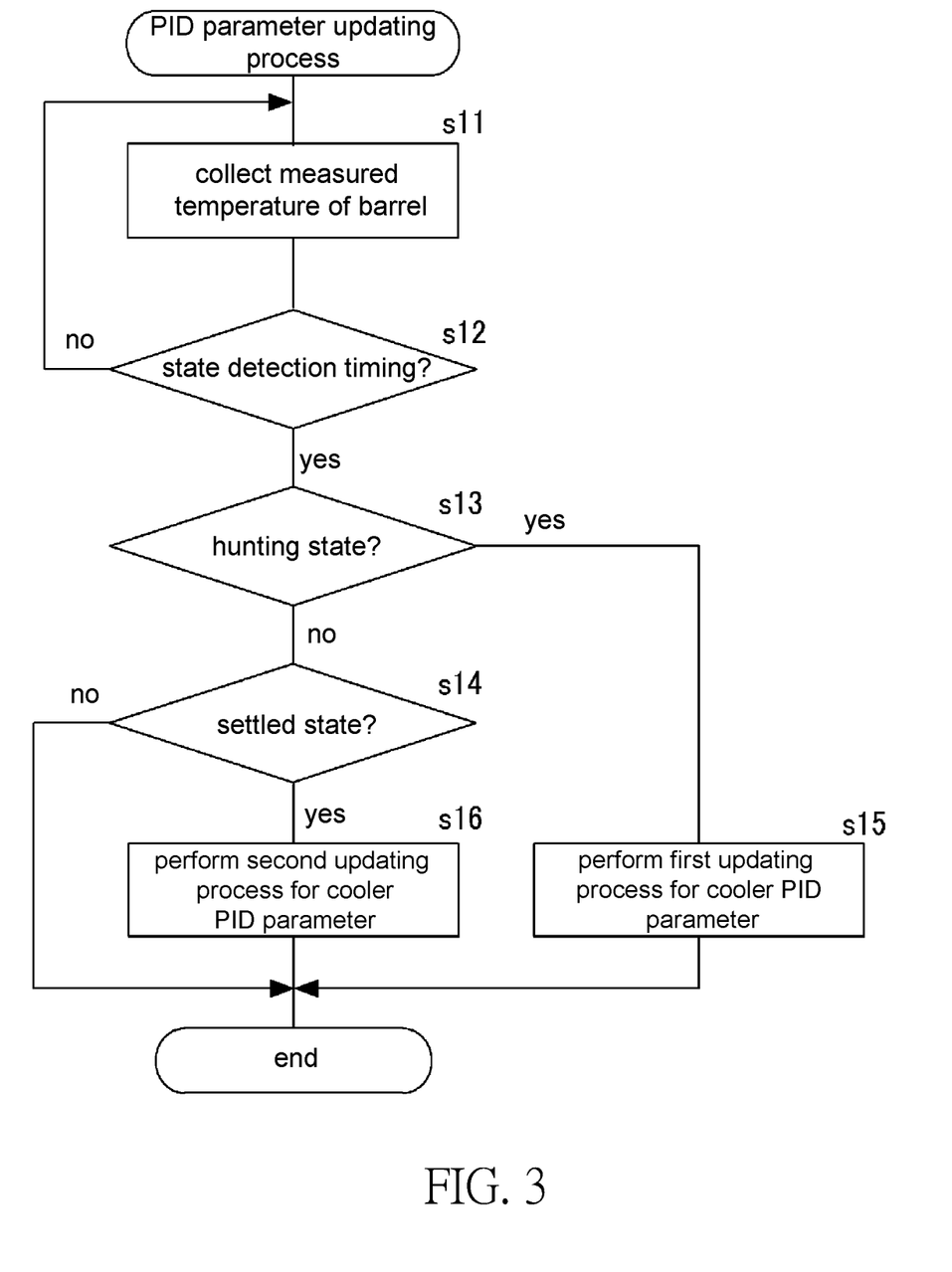
FIG. 3 is a flowchart illustrating a PID parameter updating process of the PID control device according to the embodiment.

FIG. 3 is a flowchart illustrating the PID parameter updating process of the PID control device according to this embodiment. The hunting detection functional unit 22 and the settled state detection functional unit 23 of the PID control device 1 collect the temperature of the barrel 12 until a state detection time comes in (s11 and s12). As described above, the measured value acquisition functional unit 21 acquires the temperature of the barrel 12. The hunting detection functional unit 22 and the settled state detection functional unit 23 collects the temperature of the barrel 12 acquired by the measured value acquisition functional unit 21.

The state detection time is a timing at which it is detected whether the temperature of the barrel 12 is in the hunting state and it is detected whether the temperature of the barrel 12 is in the settled state. The PID control device 1 repeatedly performs detection of whether the temperature of the barrel 12 is in the hunting state and detection of whether the temperature of the barrel 12 is in the settled state every state detection period. Here, the state detection period is defined as ft.

Figure 4:
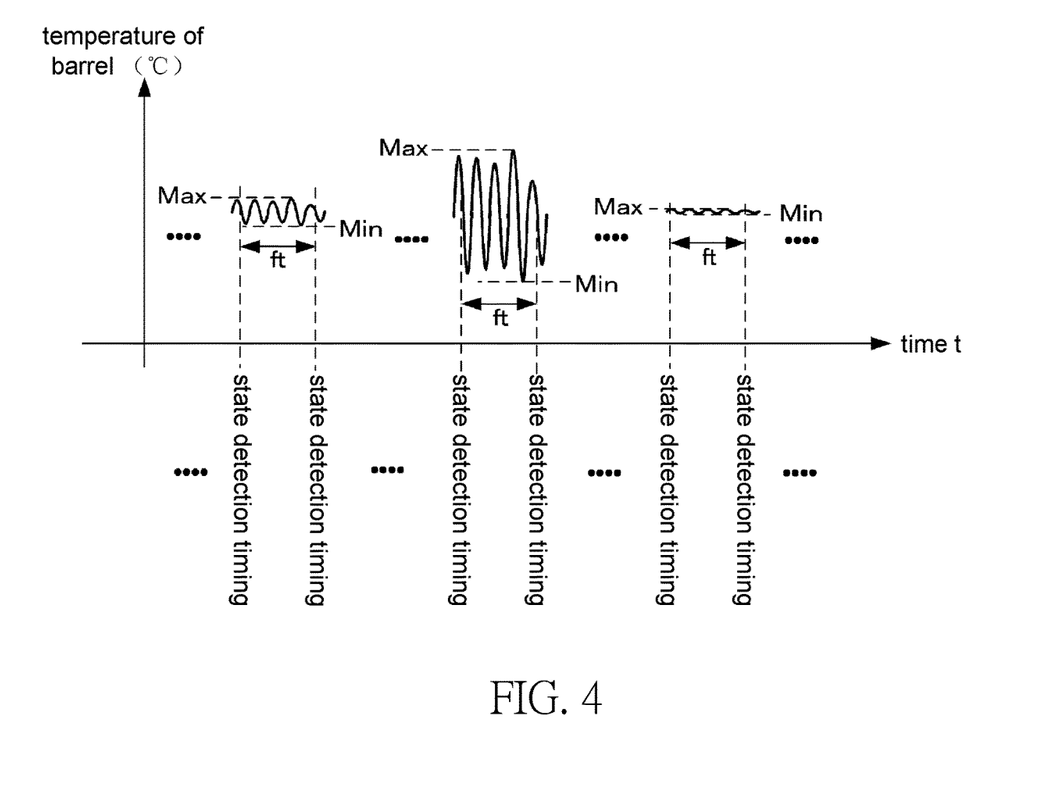
FIG. 4 is a diagram illustrating a process of detecting whether a control target is in a hunting state and a process of detecting whether a control target is in a settled state.

In the PID control device 1, when it is determined in s12 that the state detection time comes in, the hunting detection functional unit 22 detects whether the temperature of the barrel 12 is in the hunting state (s13). The hunting detection functional unit 22 acquires a temperature difference (Max-Min) between the maximum value (Max) and the minimum value (Min) of the temperature of the barrel 12 collected in the period of the current state detection period ft as the variation range of the temperature of the barrel 12 (see FIG. 4). FIG. 4 illustrates a change of the temperature of the barrel 12 collected in the state detection period ft. Three state detection periods ft are illustrated in FIG. 4. When the variation range of the temperature of the barrel 12 collected in the current state detection period ft is greater than the first variation range stored in the storage unit 4, the hunting detection functional unit 22 detects that the temperature of the barrel 12 is in the hunting state.

When the hunting detection functional unit 22 does not detect that the temperature of the barrel 12 is in the hunting state, the settled state detection functional unit 23 detects whether the temperature of the barrel 12 is in the settled state (s14). Similarly to the hunting detection functional unit 22, the settled state detection functional unit 23 acquires the temperature difference (Max-Min) between the maximum value (Max) and the minimum value (Min) of the temperature of the barrel 12 collected in the period of the current state detection period ft as the variation range of the temperature of the barrel 12. When the variation range of the temperature of the barrel 12 collected in the current state detection period ft is less than the second variation range stored in the storage unit 4, the settled state detection functional unit 23 detects that the temperature of the barrel 12 is in the settled state. The process of s13 and the process of s14 may be performed reversely in the order.

In the PID control device 1, when it is detected in s13 that the temperature of the barrel 12 is in the hunting state, the first updating functional unit 24 performs the first updating process for updating the cooler PID parameter stored in the storage unit 4 (s15) and the routine returns to s11. In the PID control device 1, when it is detected in s14 that the temperature of the barrel 12 is in the settled state, the second updating functional unit 25 performs the second updating process of updating the cooler PID parameter stored in the storage unit 4 (s16) and the routine returns to s11.

In the first updating process of s15, the P gain, the I gain, and the D gain of the cooler PID parameter stored in the storage unit 4 at that time are calculated by predetermined calculation equations Q1, Q2, and Q3. Calculation equation Q1 functions to calculate an updated value of the P gain by substituting the P gain of the cooler PID parameter at that time and the variation range of the temperature of the barrel 12 in the current state detection period ft for the calculation equation. Calculation equation Q2 functions to calculate an updated value of the I gain by substituting the I gain of the cooler PID parameter at that time and the variation range of the temperature of the barrel 12 in the current state detection period ft for the calculation equation.

Calculation equation Q3 functions to calculate an updated value of the D gain by substituting the D gain of the cooler PID parameter at that time and the variation range of the temperature of the barrel 12 in the current state detection period ft for the calculation equation.

The first updating functional unit 24 stores the P gain, the I gain, and the D gain calculated using Calculation equations Q1, Q2, and Q3 as the cooler PID parameter in the storage unit 4 (updates the cooler PID parameter stored in the storage unit 4). Calculation equation Q1 is a calculation equation for setting the value of the calculated P gain (the updated value of the P gain) to be smaller than the value of the P gain at that time (the non-updated value of the P gain). When the variation range of the temperature of the barrel 12 is greater than the first range, the P gain of the PID parameter may be a value which is in an appropriate range and is a value which is greater than a median value of the appropriate range.

In the second updating process of s16, the P gain, the I gain, and the D gain of the cooler PID parameter stored in the storage unit 4 at that time are calculated by predetermined calculation equations R1, R2, and R3. Calculation equation R1 functions to calculate an updated value of the P gain by substituting the P gain of the cooler PID parameter at that time and the variation range of the temperature of the barrel 12 in the current state detection period ft for the calculation equation. Calculation equation R2 functions to calculate an updated value of the I gain by substituting the I gain of the cooler PID parameter at that time and the variation range of the temperature of the barrel 12 in the current state detection period ft for the calculation equation. Calculation equation R3 functions to calculate an updated value of the D gain by substituting the D gain of the cooler PID parameter at that time and the variation range of the temperature of the barrel 12 in the current state detection period ft for the calculation equation.

The second updating functional unit 25 stores the P gain, the I gain, and the D gain calculated using Calculation equations R1, R2, and R3 as the cooler PID parameter in the storage unit 4 (updates the cooler PID parameter stored in the storage unit 4). Calculation equation R1 is a calculation equation for setting the value of the calculated P gain (the updated value of the P gain) to be larger than the value of the P gain at that time. When the variation range of the temperature of the barrel 12 is smaller than the second range, the P gain of the PID parameter may be a value which is in an appropriate range and is a value which is smaller than a median value of the appropriate range.

In the PID control device 1, when it is detected that the temperature of the barrel 12 is not in the hunting state and that the temperature of the barrel 12 is not in the settled state, the routine returns to s11 without updating the cooler PID parameter stored in the storage unit 4 (without performing the process of s15 or s16).

In this way, the PID control device 1 according to this embodiment updates the value of the PID parameter to a more appropriate value at that time regardless of whether the value is outside of an appropriate range. Accordingly, the PID control device 1 according to this embodiment can prevent the value of the PID parameter from departing from an appropriate range and to immediately update the value of the PID parameter to a value in an appropriate range even when the value of the PID parameter is outside of the appropriate range. That is, it is possible to shorten a period in which the value of the PID parameter is outside of an appropriate range. It is possible to improve a production efficiency of products in the extrusion molding machine 11 and to suppress an increase in running costs.

In the above description, it has been described that the heater PID parameter is not updated in s15 and 16, but the heater PID parameter may be updated similar to the cooler PID parameter.

When the amount of operation for the cooler 15 calculated in s4 is zero, that is, when the amount of operation for the cooler 15 output from the second output unit 6 is zero, the PID control for the heater 14 is estimated not to be appropriate and thus it is preferable that the cooler PID parameter not be updated in s15 and s16. Similarly, when the amount of operation for the heater 14 calculated in s3 is zero, that is, when the amount of operation for the heater 14 output from the first output unit 5 is zero, the PID control for the cooler 15 is estimated not to be appropriate and thus it is preferable that the heater PID parameter not be updated in s15 and s16.

In the above description, it has been described that the P gain, the I gain, and the D gain of the cooler PID parameter are updated in s15 and s16, but only the P gain may be updated and the I gain and the D gain may not be updated.

In the above description, it has been described above that when the temperature of the barrel 12 is neither in the hunting state nor in the settled state, the PID parameters (the cooler PID parameter and the heater PID parameter) are not updated, but the PID parameters may be updated in this case.

While the invention has been described with reference to a PID control device that performs heating and cooling control, the invention can be applied to a device that performs PID control on one of heating and cooling. The invention can be applied to a PID control device in which a control target is a pressure, a speed, or the like instead of a temperature.

What is claimed is:

1. A PID (proportional-integral-derivative) control device comprising: a processor; a memory comprising instructions to be executed by the processor; a storage unit, configured to store a target value of a control target and a PID parameter; and an output device, configured to output an amount of operation calculated by the processor, wherein the processor is configured to execute following steps: a measured value acquiring unit configured to process a sensing signal of a sensor that measures the control target and to acquire a measured value of the control target; a an operation amount calculating unit configured to calculate the amount of operation using the PID parameter and a difference between the measured value of the control target and the target value of the control target; a variation range detecting unit configured to detect a variation range of the measured value of the control target; and an update unit configured to update the PID parameter on the basis of the variation range of the measured value of the control target detected by the variation range detecting unit, wherein the update unit is configured to perform a first update process for updating the PID parameter stored in the storage unit when the variation range of the measured value of the control target detected by the variation range detecting unit is greater than a first range, and perform a second update process for updating the PID parameter stored in the storage unit when the variation range of the measured value of the control target detected by the variation range detecting unit is less than a second range.

2. The PID control device according to claim 1, wherein the first range is greater than the second range.

3. The PID control device according to claim 2, wherein the first update process includes updating a proportional gain for proportional control of the PID parameter to a value smaller than the proportional gain at that time.

4. The PID control device according to claim 3, wherein the operation amount calculating unit calculates an amount of operation for a heater and an amount of operation for a cooler.

5. The PID control device according to claim 2, wherein the second update process includes updating a proportional gain for proportional control of the PID parameter to a value greater than the proportional gain at that time.

6. The PID control device according to claim 2, wherein the operation amount calculating unit calculates an amount of operation for a heater and an amount of operation for a cooler.

7. The PID control device according to claim 1, wherein the first update process includes updating a proportional gain for proportional control of the PID parameter to a value smaller than the proportional gain at that time.

8. The PID control device according to claim 7, wherein the second update process includes updating a proportional gain for proportional control of the PID parameter to a value greater than the proportional gain at that time.

9. The PID control device according to claim 7, wherein the operation amount calculating unit calculates an amount of operation for a heater and an amount of operation for a cooler.

10. The PID control device according to claim 1, wherein the second update process includes updating a proportional gain for proportional control of the PID parameter to a value greater than the proportional gain at that time.

11. The PID control device according to claim 1, wherein the operation amount calculating unit calculates an amount of operation for a heater and an amount of operation for a cooler.

12. The PID control device according to claim 11, wherein the storage unit stores a heater PID parameter which is used to calculate the amount of operation for the heater and a cooler PID parameter which is used to calculate the amount of operation for the cooler as the PID parameter, and
the update unit updates the cooler PID parameter and does not update the heater PID parameter.

13. The PID control device according to claim 11, wherein the storage unit stores a heater PID parameter which is used to calculate the amount of operation for the heater and a cooler PID parameter which is used to calculate the amount of operation for the cooler as the PID parameter, and
the update unit does not update the cooler PID parameter when the amount of operation for the cooler which is output from the output device is 0.

14. The PID control device according to claim 11, wherein the storage unit stores a heater PID parameter which is used to calculate the amount of operation for the heater and a cooler PID parameter which is used to calculate the amount of operation for the cooler as the PID parameter, and
the update unit does not update the heater PID parameter when the amount of operation for the heater which is output from the output device is 0.

15. A PID (proportional-integral-derivative) control method that is performed by a computer, the PID control method comprising: processing a sensing signal of a sensor that measures a control target and acquiring a measured value of the control target; calculating an amount of operation using a difference between the measured value of the control target and a target value of the control target stored in a storage unit and a PID parameter stored in the storage unit; outputting the amount of operation calculated from an output device; detecting a variation range of the measured value of the control target; and updating the PID parameter on the basis of the variation range of the measured value of the control target detected, wherein the step to updating the PID further comprises: performing a first update process for updating the PID parameter stored in the storage unit when the variation range of the measured value of the control target detected is greater than a first range, and performing a second update process for updating the PID parameter stored in the storage unit when the variation range of the measured value of the control target detected is less than a second range.

16. A non-transitory machine-readable storage medium for storing instructions to be loaded by a PID (proportional-integral-derivative) control device comprising a processor, the processor configured to perform instructions comprising: processing a sensing signal of a sensor that measures a control target and acquiring a measured value of the control target; calculating an amount of operation using a difference between the measured value of the control target and a target value of the control target stored in a storage unit and a PID parameter stored in the storage unit; outputting the amount of operation calculated from an output device; detecting a variation range of the measured value of the control target; and updating the PID parameter on the basis of the variation range of the measured value of the control target detected, wherein the step to updating the PID further comprises: performing a first update process for updating the PID parameter stored in the storage unit when the variation range of the measured value of the control target detected is greater than a first range, and performing a second update process for updating the PID parameter stored in the storage unit when the variation range of the measured value of the control target detected is less than a second range.

* * * * *